United States Patent
Koga et al.

[19]

[11] Patent Number: 5,995,254
[45] Date of Patent: *Nov. 30, 1999

[54] WAVELENGTH DIVISION MULTIPLEXING LIGHT TRANSMITTING SYSTEM

[75] Inventors: Tadashi Koga; Yasuhiro Aoki, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/780,410

[22] Filed: Jan. 9, 1997

[30] Foreign Application Priority Data

Jan. 10, 1996 [JP] Japan .................................. 8-002066

[51] Int. Cl.⁶ .................................................. H04J 14/02
[52] U.S. Cl. ........................... 359/124; 359/110; 359/166
[58] Field of Search ..................................... 359/110, 141, 359/154, 166, 160, 174, 177, 179, 194, 178; 385/15, 24

[56] References Cited

U.S. PATENT DOCUMENTS

| | | | |
|---|---|---|---|
| 4,843,382 | 6/1989 | Oda et al. ................................ | 359/166 |
| 5,296,957 | 3/1994 | Takahashi et al. ....................... | 359/166 |
| 5,315,674 | 5/1994 | Asako ....................................... | 385/15 |
| 5,513,029 | 4/1996 | Roberts ................................... | 359/177 |
| 5,687,013 | 11/1997 | Henmi ..................................... | 359/117 |

FOREIGN PATENT DOCUMENTS

| | | | |
|---|---|---|---|
| 0135140 | 5/1989 | Japan ...................................... | 359/166 |
| 2-46031 | 2/1990 | Japan . | |
| 4-127625 | 4/1992 | Japan . | |
| 4-137833 | 5/1992 | Japan . | |
| 5-344067 | 12/1993 | Japan . | |

*Primary Examiner*—Rafael Bacares
*Attorney, Agent, or Firm*—Young & Thompson

[57] ABSTRACT

A wavelength division multiplexing light transmitting system which can monitor its transmission line. In which, one light among the signal lights to be wavelength multiplexed is defined as an optical fiber transmission line monitor light. A transmitter multiplexes and transmits the monitor light with the other signal lights. These lights are attenuated and introduced to the other transmission line at return circuits 12. A receiver branches the returned lights, selects the monitor light and detects a condition of the transmission line by correlation processing. The system extremely improves a SNR and a detection time of the monitor signal.

12 Claims, 2 Drawing Sheets

WAVELENGTH DIVISION MULTIPLEXING LIGHT TRANSMITTING SYSTEM

BACKGROUND OF THE INVENTION

1. Field of the Invention

The present invention relates to a system and a method of monitoring a condition of an optical fiber transmission line in a wavelength division multiplexing light transmitting system for multiplexing and transmitting signal lights having different wavelengths.

2. Description of the Related Art

In a light transmitting system, a signal light may be attenuated or cut off, in an optical fiber transmission line and in a light amplifying repeater for various reasons. It is, therefore, necessary to monitor a condition of the light transmission line in order to operate the system in an effective manner.

Japanese Laid-Open Patent Application No. 5-344067 describes the following light transmission line monitoring method.

In an up optical fiber transmission line (to be referred to as an, "up line" hereinafter), a signal light having a wavelength of $\lambda 1$ is output from a transmitter for the up line and transmitted to an receiver for the up line. In a receiver for the up line, the signal light is amplified by a light amplifier, and received by a light receiving section through a band pass optical filter.

A monitor signal on the optical fiber transmission line is superimposed on the signal light by modulation in the transmitter for the up line. The signal light with the monitor signal is introduced into a down optical fiber transmission line (to be referred to as "down line" hereinafter) through a light returning circuit comprising a light attenuator, and is transmitted to a receiver for the down line.

The monitor signals arrive at different times at the receiver for the down line for each returning circuit. Thus, they can be separated by delaying the modulated signal and evaluating a correlation with the monitor signals arriving at the receiver. Accordingly, it is possible to convert a detected monitor signal and to evaluate a correlation with a predetermined standard signal to thereby monitor a loss on the light transmission line between respective repeater intervals.

A wavelength division multiplexing light transmission method is similarly carried out. In this case, the monitor signal is superimposed on at least one multiplexed signal light by modulation.

In the light transmitting system, the monitor signal is superimposed on the signal light by modulation. Thus, when carrying out the monitoring operation at a time when the system is in service, the modulating ratio must be reduced to a low level in order to prevent deterioration of the main signal. On the other hand, a signal-noise-ratio (SNR) of the monitor signal is proportional to a square of the modulation ratio. In a case of a low modulation ratio, this results in a problem, because the SNR of the monitor signal is not sufficient.

When the signal light on which the monitor signal is superimposed by modulation is introduced into the other light transmission line through the light returning circuit, the signal light is sufficiently attenuated in order to prevent the deterioration of the signal light on the light transmission line. In this case, a long time is needed to perform a correlation detection in the receiver in order to detect the attenuated monitor signal. This results in a problem that a trouble point on the light transmission line cannot be promptly specified.

Furthermore, the receiver for the down line, which receives the signal light on which the monitor signal is superimposed, simultaneously receives the signal light transmitted from a transmitter for the down line. Thus, if both transmitters for the up line and for the down line transmit the monitor signals at the same time, both receivers for the up line and for the down line receive the signal lights on which the monitor signals transmitted from the respective transmitters are superimposed. Therefore, monitoring the optical fiber transmission line becomes impossible. For this reason, in the conventional light transmission line monitoring method, both the transmitting and receiving stations having a transmitter and a receiver must alternatively carry out the monitoring operation, respectively. Since it takes a long time to detect the monitor signal, for example, there may be a possibility that each station may only carry out only one monitoring operation per day.

SUMMARY OF THE INVENTION

It is, therefore, an object of the present invention to provide a light transmission line monitoring method and a wave length multiplexing light transmitting system thereof, which can solve the above mentioned problems, largely improve the SNR of the monitor signal, and sufficiently shorten the detection time of the monitor signal, wherein two stations can individually and simultaneously monitor the light transmitting line.

A wavelength division multiplexing light transmitting system of the present invention comprises a local station comprising a transmitter and a receiver, a remote station comprising a transmitter and a receiver, an up optical fiber transmission line connecting the local station and the remote station, a down optical fiber transmission line connecting the local station and the remote station, at least one light returning circuit which returns at least a portion of light from the up optical fiber transmission line to the down optical fiber transmission line and at least one light returning circuit which returns at least a portion of light from the down optical fiber transmission line to the up optical fiber transmission line. In the system, the local station and the remote station each comprise a monitor signal multiplexer and a monitor signal demultiplexer. The multiplexer multiplexes and the demultiplexer demultiplexes, respectively, the monitor signal with at least one signal light.

A method of monitoring a light transmission line includes a step of multiplexing a monitor light with a signal light and transmitting the multiplexed lights, a step of attenuating the lights from one optical transmission line and introducing attenuated lights into the other optical fiber transmission line and a step of receiving the attenuated lights and selecting the monitor light. Therefore, monitoring of the transmission line can be carried out promptly and its SNR can be improved.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENT

Figure 1:
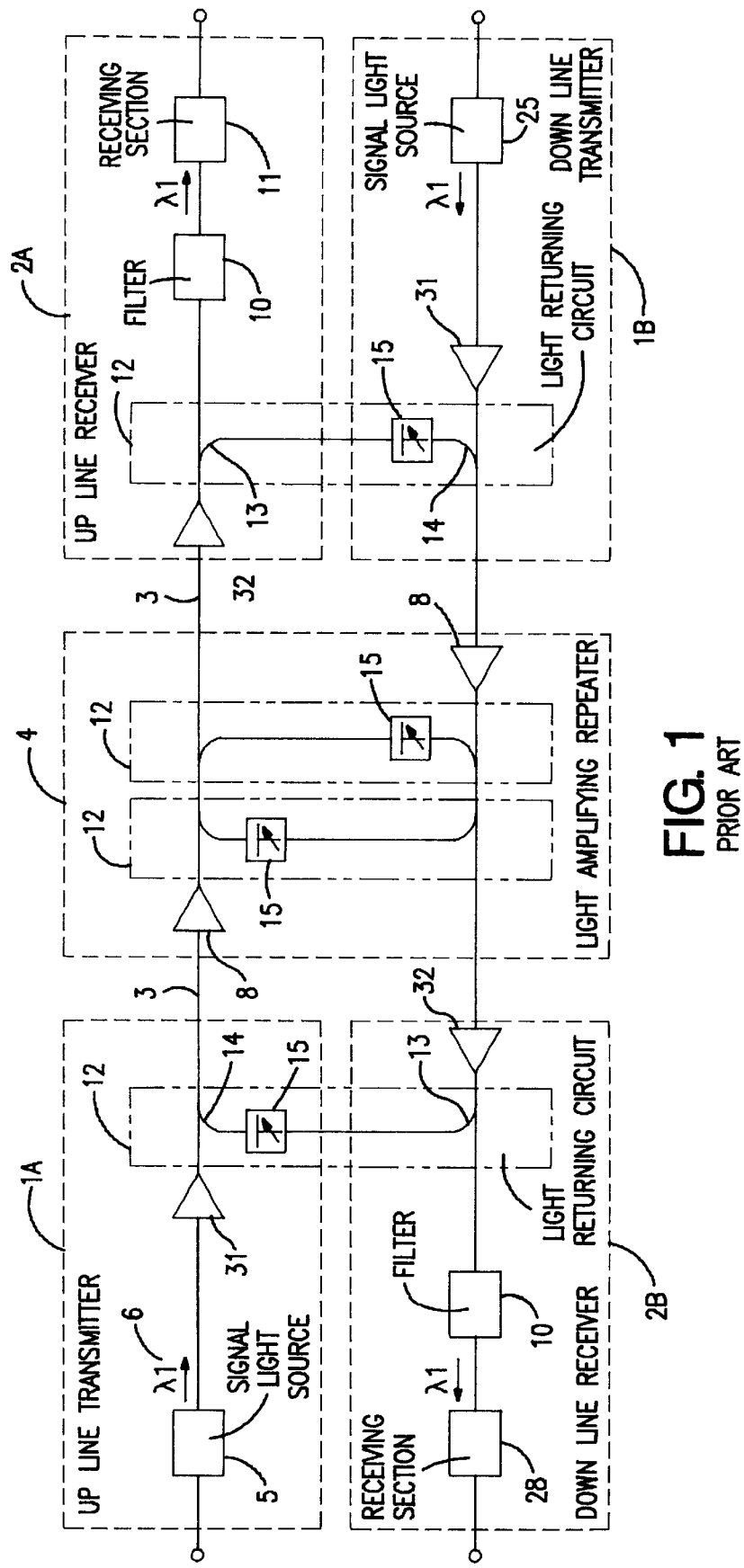
FIG. 1 is a block diagram showing a conventional light transmitting system.

To better understand the present invention, a brief reference will be made to a conventional light transmitting system, shown in FIG. 1. In an up optical fiber transmission line, a signal light 6 having a wavelength of λ1 output from a signal light source 5 is amplified by a light amplifier 31 in a transmitter for the up line 1A, and transmitted to a receiver for the up line 2A through an optical fiber transmission line 3 and a light amplifying repeater 4. In the receiver for the up line 2A, the signal light 6 is amplified by a light amplifier 32, and is received by a light receiving section 11 through a band pass optical filter 10.

A monitor signal on the optical fiber transmission line is superimposed on the signal light 6 by modulation in the signal light source 5 in the transmitter for the up line 1A. The monitor signal is introduced into a down optical fiber transmission line through a light returning circuit 12 comprising light couplers 13, 14 and a light attenuator 15, and transmitted to a light receiving section 28 in a receiver for the down line 2B. The monitor signal arrives at a different time at the receiver for the down line 2B on the down light transmission line for each returning circuit 12. Thus, it can be separated by delaying the modulation signal and by evaluating a correlation with the monitor signal arriving at the receiver for the down line 2B. Accordingly, it is possible to convert a detected monitor signal and to evaluate a correlation with a predetermined standard signal to thereby monitor a loss on the light transmission line between respective repeater intervals.

Figure 2:
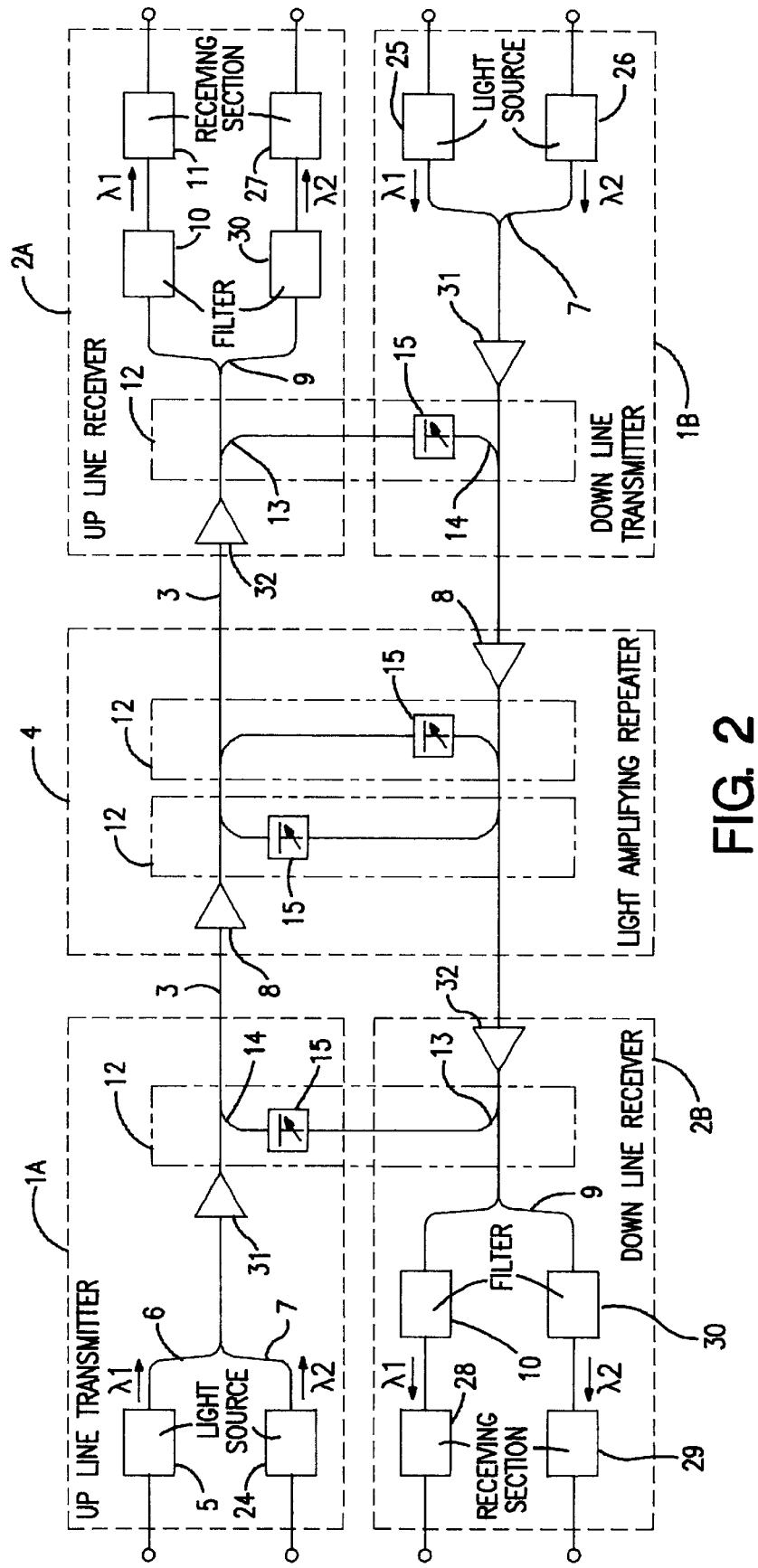
FIG. 2 is a block diagram showing an embodiment of a wavelength division multiplexing light transmitting system in accordance with the present invention.

Referring to FIG. 2, a wavelength division multiplexing light transmitting system and a light transmission line monitoring method embodying the present invention are shown.

In FIG. 2, elements which are similar to corresponding elements shown in FIG. 1 will be designated with like reference numerals.

FIG. 2 shows an example in which lights having two wavelengths that are different from each other are amplified and transmitted by one unit of a light amplifying repeater.

In an up light transmitting system, signal light sources 5 and 24 in a transmitter for the up line 1A output lights having wavelengths of λ1 and λ2 that are different in wavelength from each other. These lights are multiplexed by a coupler 7, amplified by a light amplifier 31 and input through a light returning circuit 12 to an up optical fiber transmission line 3. This light returning circuit 12 is disposed in the transmitter for the up line 1A and in the receiver for the down line 2B in one transmitting and receiving station. The transmitter for the up line 1A and the receiver for the down line 2B collectively form the transmitting and receiving station. The light returning circuit 12 comprises a light coupler 13, a light attenuator 15 and a light coupler 14, and attenuates a signal light on the down optical fiber transmitting line to thereby introduce it into the up optical fiber transmission line.

A light amplifying repeater 4 comprises two light returning circuits 12 in addition to a light amplifier 8. The light returning circuits 12 attenuate the respective signal lights and introduces them into the other optical fiber transmission line. When the signal lights arrive at the receiver for the up line 2A, they are amplified by a light amplifier 32, passed through the light returning circuit 12, branched by a coupler 9, and received by the receiving sections 11 and 27 through band pass light filters 10 and 30.

The light receiving sections 11 and 27 receive lights having wavelengths of λ1 and λ2 which are transmitted from a transmitter for a down line 1B and introduced through the light returning circuit 12 into the up line, in addition to the lights having the wavelengths of λ1 and λ2 transmitted from the transmitter from the up line 1A. This is similarly carried out in light receiving sections 28 and 29 in the receiver for the down line 2B.

The light having the wavelength of λ2 is defined as a monitor light. The signal light having the wavelength of λ1 and the monitor light having the wavelength of λ2 that are multiplexed in the transmitter for the up line 1A are attenuated by the two units of the light returning circuits 12, and introduced into the down line. These lights arrive at the receiver for the down line 2B, and are amplified by the light amplifier 32, and branched by the coupler 9. Then, the light having the wavelength of λ2 is passed through the band pass light filter 30 and received by the light receiving section 29. After the light having the wavelength of λ2 is received, it is converted into an electric signal, and a strength thereof is measured by a correlation processing and a condition (gain) of the light transmission line is detected. The monitor lights having the wavelength of λ2 are returned from the light returning circuits 12 located at the light amplifying repeater 4 and the other transmitting and receiving station, respectively. The receiver for the line 2A and the transmitter for the down line 1B collectively form the other transmitting and receiving station. However, since there is a difference between times from the transmitting to the receiving, it is possible to adjust this difference between the delayed times to thereby separate and simultaneously detect the two monitor lights.

The receiver for the down line 2B receives lights having the wavelengths of λ1 and λ2 transmitted from the transmitter for the down line 1B, in addition to the lights returned from the light returning circuits 12. For this reason, when detecting the very small monitor light having the wavelength of λ2, the strong light having the wavelength of λ2 transmitted from the transmitter for the down line 1B is removed as noise by the correlation processing. The monitor light (λ2) transmitted from the transmitter for the up line 1A can have a modulation frequency different from that of the monitor light (λ2) transmitted from the transmitter for the down line 1B.

It is possible to dispose more than two light returning circuits 12. For example, in a case of disposing the light returning circuits every 200 to 300 units of the light amplifying repeater, it is possible to greatly reduce the deterioration of the signal. Thus, it is desirable that the light attenuated by the light returning circuit 12 is attenuated to a value equal to or less than approximately 40 dB, for the lights having the wavelengths of λ1 and λ2 transmitted from the transmitter for the down line 1B.

The local station and the remote station can use, as the monitor lights, wavelengths that are different from each other, and different from the wavelengths used in the wavelength multiplexing operation, respectively. In this case, both the stations can monitor the condition on the optical fiber transmission line at the same time. The wavelength used in the wave length multiplexing operation can also include more than three wavelengths.

The location at which the light returning circuit 12 is disposed is not limited to within the light amplifying repeater and to within the transmitting and receiving stations at both ends in the light transmitting line. However, it is desirable to dispose the light returning circuits at the above mentioned places in view of apparatus maintenance and like considerations.

In the above mentioned configuration, one wavelength only is assigned to the monitor signal. As a result, it is possible to transmit the monitor signal under a modulation ratio of 100% and obtain a sufficient SNR. Further, it is possible to largely shorten the time required to demodulate the monitor signal.

In the configuration shown in FIG. 2, the signal lights having the two wavelengths of, for example, λ1 (1556 nm) and λ2 (1559 nm) respectively are output from the signal light sources 5, 24 composed of an InGaAs/InP distribution feedback typed semiconductor laser having a wavelength of 1.55 microns and a LiNbO3 light modulator for external-modulating an output from the laser, in the transmitter for the up line 1A. The light amplifiers 31, 32 can use an 1.48 micron InGaAs/In Fabry-Perot type semiconductor laser excitation erbium added optical fiber amplifier. Also, the light amplifier 8 has a configuration similar to that of the above-mentioned light amplifiers. However, a repeater gain thereof is set to 16.8 dB at a gain peak wavelength. The coupler 13, 14 and the attenuator 15 constituting the light returning circuit 12 are composed of a single mode type optical fiber coupler. The other light returning circuits 12 have a similar configuration. The optical fiber transmission line 3 can use a dispersion shift type optical fiber having a mode field diameter of 8 microns (1558 nm), a wavelength dispersion value of 1 ps/nm/km (1558 nm), a loss of 0.21 dB/km and a length of 80 km. The receiver for the up line 2A can be provided with band pass light filters 10, 30 having transmission center wavelengths of λ1 (1556 nm) and λ2 (1559 nm) and light receiving sections 11, 27 composed of an InGaAs-PIN photo diode. The down light transmitting system has a configuration similar to the above-mentioned configuration.

In order to compare the present invention with the conventional method, the present invention was compared with the above mentioned conventional example, by using the above mentioned respective components, with both the attenuation values of the returned light signals set at approximately 45 dB. By constituting the conventional light transmitting apparatus in FIG. 1, the monitor signal was transmitted at a modulation ratio of approx. 5% when the system is in service. In this case, it took approx. four hours to integrate and demodulate the monitor signal. On the other hand, in the above mentioned configuration in accordance with the present invention, it took approx. 30 seconds to obtain the same SNR. If the modulation time is made longer under the configuration of the present invention, it is possible to obtain a further improvement in SNR.

The present invention is not limited to the configuration of the above mentioned embodiment. The optical fiber amplifier may be of another kind. The semi-conductor laser may be made of another material such as GaAlAs/GaAs or the like, and also the other constituent elements described above are not limited to those of the embodiment.

As mentioned above, in the light transmission line monitoring method and the wavelength division multiplexing light transmitting system in accordance with the present invention, one special wavelength among a plurality of lights to be multiplexed is used as the monitor signal. This is introduced, by multiplexing the monitor signal with the signal light, into the other optical fiber transmission line, and returned to the receiver and detected. As a result, it is possible to largely improve the SNR of the monitor signal and it is also possible to make the detection time of the monitor signal extremely short.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. A wavelength division multiplexing light transmitting system comprising:
   a local station comprising a transmitter and a receiver;
   a remote station comprising a transmitter and a receiver;
   an up optical fiber transmission line connecting said local station and said remote station;
   a down optical fiber transmission line connecting said local station and said remote station;
   at least one light returning circuit which continuously returns at least a portion of light from said up optical fiber transmission line to said down optical fiber transmission line;
   at least one light returning circuit which continuously returns at least a portion of light from said down optical fiber transmission line to said up optical fiber transmission line;
   said local station and said remote station each comprising a monitor light multiplexer for multiplexing a monitor light and at least one signal light, the monitor light and the signal light having different wavelengths and about the same power level which shortens a time needed to detect the monitor light, and a monitor light demultiplexer for demultiplexing the monitor light from the signal light.

2. The wavelength division multiplexing light transmitting system as claimed in claim 1, wherein said multiplexer comprises a coupler and said demultiplexer comprises a coupler and at least one filter.

3. The wavelength division multiplexing light transmitting system as claimed in claim 1, further comprising at least one light amplifying repeater disposed on said up and down optical fiber transmission lines.

4. The wavelength division multiplexing light transmitting system as claimed in claim 1, wherein a plurality of light returning circuits are disposed in each of said up and down optical fiber transmission lines, at least one of said plurality of light returning circuits returning light from said up optical fiber transmission line to said down optical fiber transmission line and at least one of said plurality of light returning circuits returning light from said down optical fiber transmission line to said up optical fiber transmission line.

5. The wavelength division multiplexing light transmitting system as claimed in claim 3, wherein said at least one light returning circuit is located within at least one of said light amplifying repeater and said local and remote stations, respectively.

6. The wavelength division multiplexing light transmitting system as claimed in claim 1, wherein said monitor light transmitted from said local station has a wavelength which is different from a wavelength of the monitor light transmitted from said remote station.

7. The wavelength division multiplexing light transmitting system as claimed in claim 1, wherein the monitor light transmitted from one of said local and remote stations is different in modulation frequency from the monitor light having the same wavelength transmitted from the other of said local and remote stations.

8. The wavelength division multiplexing light transmitting system as claimed in claim 3, wherein said at least one light amplifying repeater comprises two light returning circuits connected between said up and down optical fiber transmission lines.

9. A method of monitoring a light transmission line comprising an up optical fiber transmission line and a down optical fiber transmission line connecting a local and a remote station, comprising the steps of:

continuously multiplexing, at each of said local and remote stations, a monitor light with at least one signal light, the monitor light and the signal light having different wavelengths and about the same power level which shortens a time needed to detect the monitor light;

transmitting said lights multiplexed at said local station from said local station to said remote station on said up optical fiber transmission line and transmitting said lights multiplexed at said remote station from said remote station to said local station on said down optical fiber transmission line;

attenuating said lights from one of said up and down optical fiber transmission lines and introducing attenuated lights into the other of said up and down optical fiber transmission lines;

receiving said attenuated lights and selecting said monitor light, at each of said local and remote stations.

10. The light transmission line monitoring method as claimed in claim 9, wherein at said attenuating step, said multiplexed lights are attenuated at a plurality of locations in said up optical fiber transmission line and introduced at a corresponding plurality of locations in said down optical fiber transmission line, said multiplexed lights also being attenuated at a plurality of locations in said down optical fiber transmission line and introduced at a corresponding plurality of locations in said up optical fiber transmission line.

11. The light transmission line monitoring method as claimed in claim 9, wherein said monitor light transmitted from one of said local and remote stations has a wavelength which is different from a wavelength of the monitor light transmitted from the other of said local and remote stations.

12. The light transmission line monitoring method as claimed in claim 9, wherein said monitor light transmitted from one of said local and remote stations is different in a modulation frequency from said monitor light having a same wavelength transmitted from the other of said local and remote stations.

* * * * *